US005582678A

United States Patent [19]

Komuro

[11] Patent Number: 5,582,678

[45] Date of Patent: Dec. 10, 1996

[54] PROCESS FOR PRODUCING INK JET RECORDING HEAD

[75] Inventor: Hirokazu Komuro, Hiratsuka, Japan

[73] Assignee: Canon Kabushiki Kaisha, Tokyo, Japan

[21] Appl. No.: 396,063

[22] Filed: Feb. 28, 1995

Related U.S. Application Data

[63] Continuation of Ser. No. 263,402, Jun. 21, 1994, abandoned, which is a continuation of Ser. No. 11,098, Jan. 29, 1993, abandoned, which is a continuation of Ser. No. 774,368, Oct. 10, 1991, abandoned, which is a division of Ser. No. 637,970, Jan. 9, 1991, abandoned, which is a continuation of Ser. No. 267,627, Oct. 27, 1988, abandoned, which is a continuation of Ser. No. 109,944, Oct. 16, 1987, abandoned.

[30] Foreign Application Priority Data

Oct. 20, 1986 [JP] Japan .................................. 61-247448

[51] Int. Cl.$^6$ ........................... G01D 15/18; G01D 15/16

[52] U.S. Cl. .................... 216/27; 346/139 R; 346/140.1; 346/141; 216/48

[58] Field of Search .................................... 156/153, 155, 156/630, 633, 644, 652, 655; 346/140 R, 1.1, 139 R, 140.1, 141; 430/323

[56] References Cited

U.S. PATENT DOCUMENTS 3,548,189 12/1970 Meinel et al. ...................... 156/643 X
4,394,670 7/1983 Sugitani .
4,417,251 11/1983 Sugitani .................................. 346/1.1
4,558,333 12/1985 Sugitani et al. .................... 346/140 R
4,635,077 1/1987 Itoh ..................................... 346/140 R
4,657,631 4/1987 Noguchi ................................. 156/655
4,775,445 10/1988 Noguchi .
5,030,317 7/1991 Noguchi ................................. 156/630

FOREIGN PATENT DOCUMENTS 0168838 10/1982 Japan ..................................... 156/633
60-230860 11/1985 Japan ................................ 346/140 R

OTHER PUBLICATIONS

DeForest, W. S., *Photoresist Materials and Processes*, McGraw–Hill, Inc., 1975, pp. 2 and 3.

*Primary Examiner*—Jeff H. Aftergut
*Attorney, Agent, or Firm*—Fitzpatrick, Chella, Harper & Scinto

[57] ABSTRACT

An ink jet recording head wherein a substrate with a groove for forming an ink pathway connected to an orifice for discharging ink and a plate member are bonded so as to form the ink pathway by charging the recessed portion of groove with a filling material;

evening the upper surface of the substrate and the upper surface of said filling material;

bonding the substrate and said plate member to the evened surface; and removing said filling material therefrom.

9 Claims, 4 Drawing Sheets

PROCESS FOR PRODUCING INK JET RECORDING HEAD

This application is a continuation, of application Ser. No. 08/263,402 filed Jun. 21, 1994, now abandoned, which is a continuation of application Ser. No. 08/011,098 filed Jan. 29, 1993, which is a continuation of Ser. No. 07/774,368 filed Oct. 10, 1991, now abandoned, which is a division of Ser. No. 07/637,970 filed Jan. 9, 1991, now abandoned, which is a continuation of Ser. No. 07/267,627 filed Oct. 27, 1988, now abandoned, which is a continuation of Ser. No. 07/109,944 filed Oct. 16, 1987, now abandoned.

BACKGROUND OF THE INVENTION

1. Field of the Invention

This invention relates to a process for producing an ink jet recording head which performs recording by discharging ink.

2. Related Background Art

An ink jet recording head to be applied for the ink jet recording system is generally provided with a fine orifice for discharging ink, an ink pathway communicated to this discharging orifice and a discharging energy generating section provided at a part of the ink pathway. FIG. 1A is an example of the ink jet recording head of the prior art and in this Figure, the symbol 304 shows the discharging orifice, 305 the ink pathway and 306 the discharging energy generating section. On the other hand, 301 is a substrate, 302 an ink pathway wall forming member, 303 a lid plate and 307 an ink feeding inlet.

In the prior art, as such ink jet recording head, those utilizing photosensitive resin compositions have been known. For example, U.S. Pat. No. 4,417,251 discloses an ink jet recording head in which an ink pathway wall is formed by use of a photosensitive resin composition and a rigid upper lid is laminated on the ink pathway wall forming member to form an ink pathway. Also, U.S. Pat. No. 4,394,670 discloses an ink jet recording head in which an ink pathway wall is formed by use of a photosensitive resin composition and a cover of an ink pathway formed by use of a photosensitive resin composition is laminated on the ink pathway wall forming member to form an ink pathway. These ink jet recording heads utilizing photosensitive resin compositions have excellent advantages such as easy fine working by applying the so-called photolithographic technique, etc.

In producing such ink jet recording heads as described above, however, after formation of an ink pathway wall on a substrate by use of a photosensitive resin composition such as dry film, or other composition, an ink pathway is formed by laminating on the ink pathway wall forming member a rigid upper lid or a cover of an ink pathway formed by use of a photosensitive resin composition, or other composition which becomes the cover over the ink pathway. During this operation, for improving adhesiveness of the above cover over the ink pathway with the ink pathway wall forming member or effecting improvement of uniformity at the bonded interface, it is generally practiced to press the laminate under an appropriate pressure.

During such pressing, a phenomenon called "sagging" sometimes occured. This "sagging phenomenon" is of two kinds. One is the case when the above ink pathway wall is formed by use of relatively soft substances such as a photosensitive resin composition, or other soft substances, whereby the above ink pathway wall-forming member is deformed by pressing of the lid plate to give rise to "sagging" 310 as exemplified in FIG. 1B. The other case is when at least the ink pathway wall side of the lid plate is formed by use of relatively soft substance 312 such as a photosensitive resin composition, the above ink pathway wall side of the lid plate is deformed when this is pressed, to give rise to "sagging" 311 as exemplified in FIG. 1C. Further, the above two kinds of "sagging" sometimes occurred as a mixture.

Also, such "sagging" is sometimes apt to occur particularly in a multi-array type ink jet recording head having a plurality of fine ink pathways arranged, for example, having a plurality of discharging orifices over the entire paper width of a recording paper of A4 width (210 mm) and in some heads, the amount of sagging became as much as ⅓ of the total amount to exert deleterious influences on the discharging characteristic such as instability of the ink discharging direction, whereby recording characteristic was deteriorated. In addition, such "sagging" may be sometimes differed from one ink pathway to another, whereby the ink discharging performance was varied for every pathway to worsen the recording characteristic.

For prevention of such "sagging", for example, it has been attempted to arrange a supporting column for prevention of sagging within the ink pathway as disclosed in the above U.S. Pat. No. 4,394,670. However, even when such a supporting column may be provided, the sagging prevention effect is insufficient, and "sagging" frequently occurred particularly in an ink jet recording head in which fine ink pathways are arranged in a large number, thereby sometimes causing lowering in yield. Such a problem was the common problem in the processes for forming ink jet recording heads in which a part of the ink pathway was formed by use of a material having temporarily no rigidity such as photosensitive resin compositions, thermosetting resins, or other materials.

SUMMARY OF THE INVENTION

The present invention has been accomplished in view of the various points as described above and provides a process for producing an ink jet recording head which has prevented generation of "sagging" as described above.

It is also another object of the present invention to provide a process for producing an ink jet recording head which can produce ink jet recording heads with stable ink discharging performance with good yield.

Still another object of the present invention is to provide a process for producing an ink jet recording head wherein a substrate on which unevenness is formed providing a groove for forming an ink pathway connected to an orifice for discharging ink and a plate member are bonded to form said ink pathway, comprising the steps of:

charging the recessed portion of said unevenness with a filling member;

making substantially the same level by flattening treatment the upper surface of the protruded portion of said unevenness and the upper surface of said filling member with which the recessed portion is charged;

bonding said substrate and said plate member with the side subjected to the flattening treatment being inside; and removing said filling member to form said ink pathway.

DESCRIPTION OF THE PREFERRED EMBODIMENTS

According to the process of the present invention, since a lid plate (plate member) is laminated on the ink pathway wall forming member under the state in which a filling member is arranged in the ink pathway as described above, deformation of the lid plate and/or the ink pathway wall forming member during lamination of the lid plate can be inhibited by the filling member, whereby generation of "sagging" as in the prior art can be prevented. For this reason, the problems of instability of ink discharging performance and lowering in yield accompanied with generation of "sagging" can be also cancelled to provide recording heads with stable discharging performance with good yield.

Figure 2A:
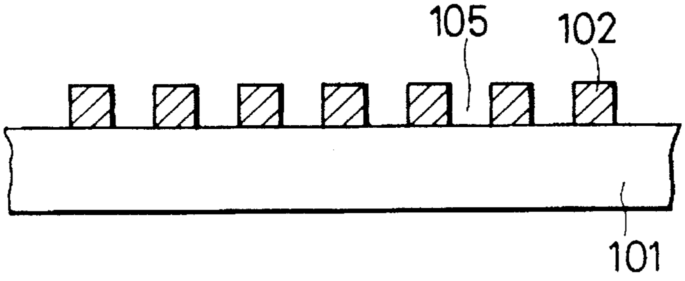
FIGS. 2A–2E are schematic sectional views of the steps for explanation of the basic embodiment of the process for producing an ink jet recording head of the present invention.
Figure 2B:
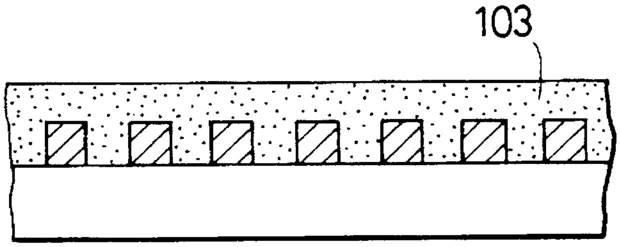
Figure 2C:
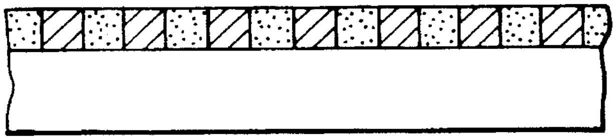

Referring now to the drawings, the present invention is described in detail below. FIGS. 2A through 2C are schematic sectional views of the steps for explanation of the basic embodiment of the present invention. In the following description, the present invention is described by referring primarily to the case in which a multi-array type recording head having a plurality of discharging orifices, but the present invention is also applicable for the single array type.

First, as exemplified in FIG. 2A, a substrate 101 having a desired discharging energy generating section (not shown) thereon is prepared, and a desired resin composition is applied on the substrate 101 by use of the method such as lamination, coating, etc. Then, by preparing an ink pathway wall forming member 102 with a desired pattern by use of the photolithographic technique or the etching technique well known in the art, protruded portions and recessed portions are formed on the substrate which provide grooves for forming ink pathways.

As the resin composition, various compositions may be available without specific limitation such as photosensitive resin compositions, thermosetting resin compositions, or other compositions. Photosensitive resin compositions are preferably used with negative-type photoresists being optimal. As negative-type photoresist, there may be included, for example, Photec SR3000 (trade name, manufactured by Hitachi Chemical Co., Ltd.), SE320, SE330, SE350 (trade names, Tokyo Ohka Co., Ltd.)

The discharging energy generating section may be formed by arranging in a desired number on the substrate 101 electrothermal transducers, electromechanical transducers, or other transducers well known in the art. The substrate 101 can be made of either an inorganic material or an organic material, and its material is not particularly limited.

Next, as exemplified in FIG. 2B, a filling member 103 is laminated so as to cover over both the ink pathway 105 and the ink pathway wall forming member 102. During this operation, the layer thickness of the filling member 103 is required to be made thicker than at least that of the ink pathway wall forming member. As the filling member 103, a resin composition, or other compositions can be used and the resin composition may be the same as the resin composition constituting the above ink pathway wall, or it may be a different kind, but preferably liquid with high viscosity.

The material for the filling member preferably used is positive-type photoresists. As positive-type photoresist, there may be included, for example, AZ4620, AZ1375 (trade names, manufactured by Hoechst), Microposit TF20 (trade name, manufactured by Shipley) and OFPR800 (trade name, Tokyo Ohka Co., Ltd.)

Next, as exemplified in FIG. 2C, a part of the above filling member 103 is removed by etching, etc. until the ink pathway wall 102 is exposed to be smoothened (flattening treatment). As the etching method, for example, dry etching by use of $O_2$ plasma usher, etc. may be suitably used, but also wet etching may be available.

Figure 1B:
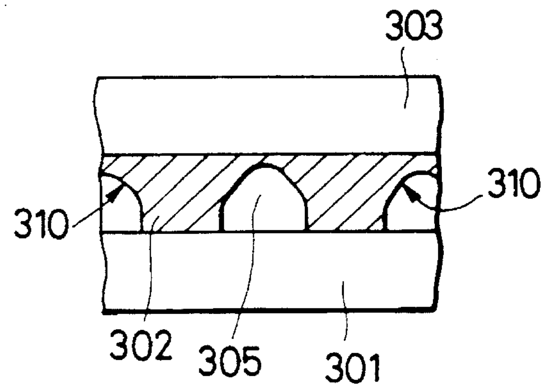
FIG. 1B PRIOR ART
FIGS. 1B and 1C are schematic sectional views for explanation of the "sagging phenomenon" in the prior art.
Figure 1C:
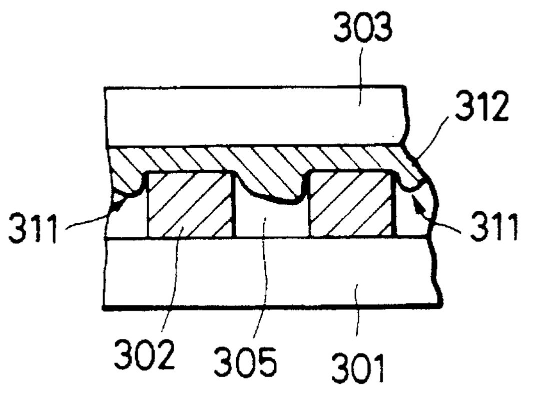
FIG. 1C PRIOR ART
Figure 2D:
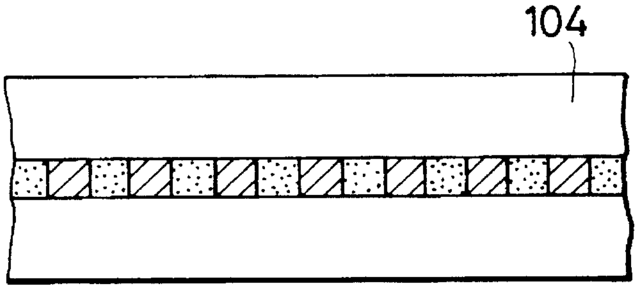

Next, as exemplified in FIG. 2D, a lid plate 104 (plate member) is laminated as the cover over the ink pathway. During this operation, "sagging" as exemplified in, for example, FIG. 1B occurred in the prior art method. However, since the filling member 103 is arranged within the ink pathway, the ink pathway wall forming member 102 will not be deformed even when the lid plate 104 may be pressed with a desired pressure, whereby generation of "sagging" as in the prior art example can be prevented. Also, while such "sagging" will more readily occur in the case when the widths are different for every pathway rather than the case when the ink pathways have the same width as in this example, since generation of "sagging" can be prevented by provision of the filling member in the present invention, the pathway width can be selected freely to increase degree of freedom in designing during production of recording head. The lid plate 104 may be made of any desired material similarly as the above substrate 101, but of course it can be formed of the resin composition as described above.

After the step of bonding, the bonded member of said substrate and said plate member is subjected to exposure treatment.

Figure 2E:
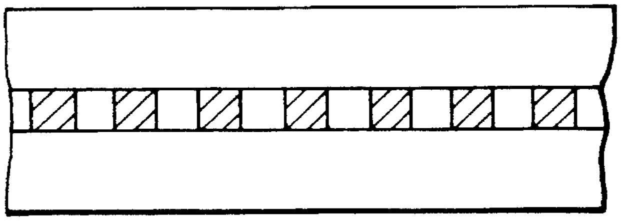

Finally, ink pathways are formed by removing the filling member 103 as exemplified in FIG. 2E to complete the ink jet recording head. During this operation, the form around the discharging orifice may be finished by means of a slicer, or other means, if desired.

The method for removing the filling member 103 is not particularly limited, but specifically, for example, a method for removing the filling member 103 by dipping it in a liquid which dissolves or swells the member, or another method may be employed. For promotion of the removal, removal promoting treatment such as sonication may be also used in combination.

According to such process of the present invention, since "sagging" of the ink pathway wall forming member during lamination of the lid plate can be prevented, the shape of the ink pathway wall will not be impaired to enable stabilization of discharging and also improve yield.

In order to describe the present invention in more detail, Examples of the present invention are shown below.

EXAMPLE 1

Figure 1A:
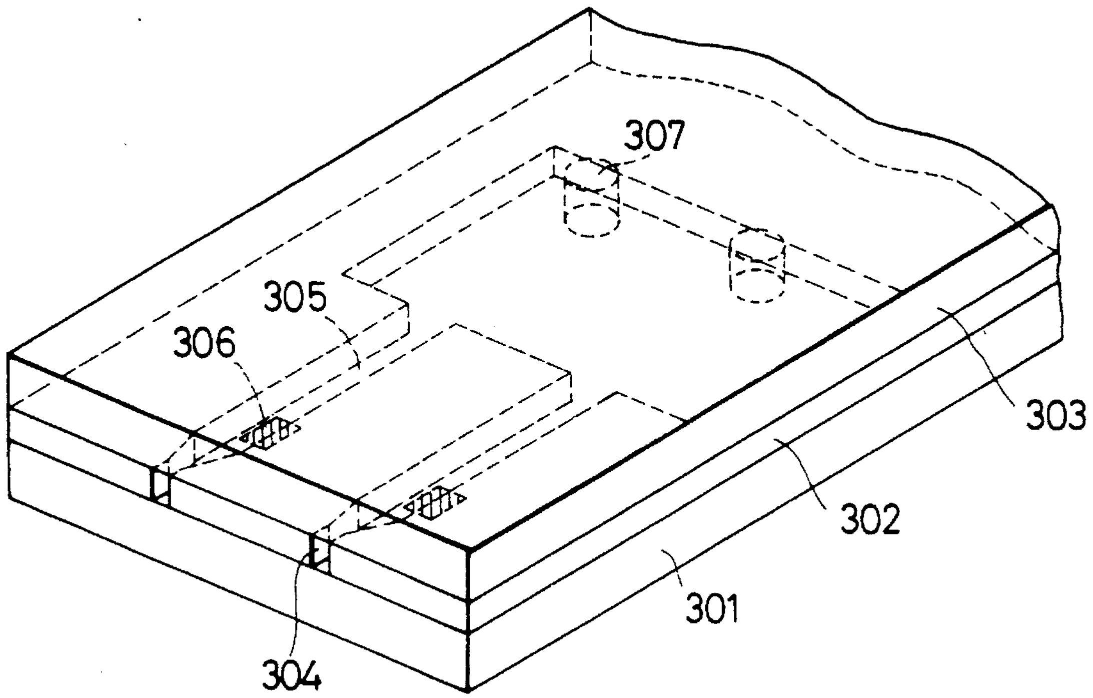
FIG. 1A PRIOR ART
FIG. 1A is a schematic perspective view of one example of the ink jet recording head of the prior art.

Following the procedure as shown in FIGS. 3A through 3E, the ink jet recording head shown in FIG. 1A was prepared as follows.

Figure 3A:
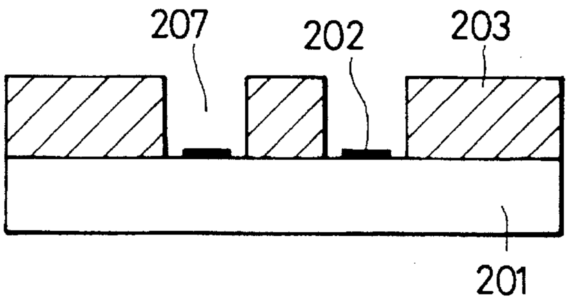
FIGS. 3A–3E are schematic sectional views of the steps for explanation of an example of the process for producing an ink jet recording head of the invention.

First, on a glass substrate 201 provided with an electrothermal transducer 202 at the discharging energy generating section as shown in FIG. 3A, a negative-type dry film (Photec SR3000, produced by Hitachi Chemical Co., Ltd.) was laminated to a thickness of 35 μm.

Next, by use of a commercially available exposure device (PLA501, produced by Canon), the above dry, film was exposed to a pattern for formation of ink pathway, then developed by use of triethane and cured to form an ink pathway wall forming member 203 with a pattern as shown in FIG. 3A.

Figure 3B:
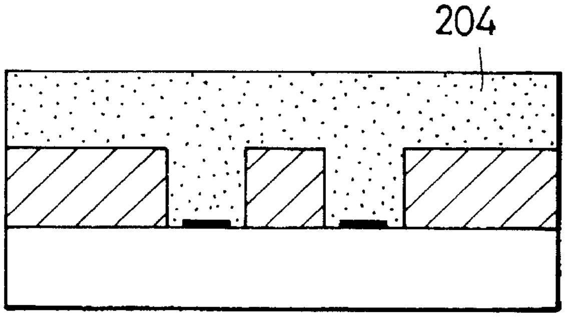

Next, a relatively highly viscous positive-type resist, for example AZ4620 (produced by Hoechst), or another positive-type resist was coated by use of spin coater, roll coater, or other coater so as to cover both the ink pathway 207 and the ink pathway wall forming member 203 to form a filling member 204 as shown in FIG. 3B. During this operation, the layer thickness of the filling member 204 is required to be made thicker than that of the ink pathway wall forming member 203, and if the thickness is not enough by one coating, coating may be repeated for several times.

Figure 3C:
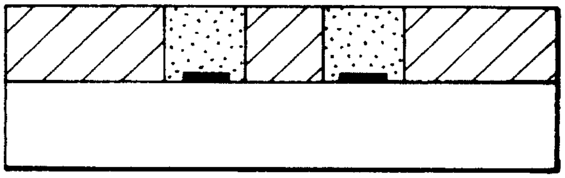

Next, by use of a commercially available dry etching device ($O_2$ plasma usher), the above filling member 204 was etched until the ink pathway wall forming member 203 was exposed (FIG. 3C). The etching conditions were 133 Pa of $O_2$ gas pressure and etching power of 500 W.

Figure 3D:
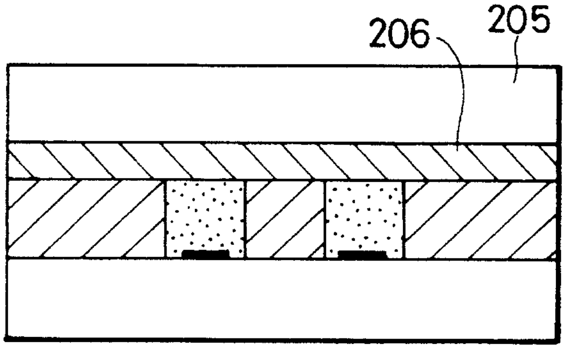

Next, as shown in FIG. 3D, by use of a glass plate having a negative-type dry film with a thickness of 10 μm (SR 3000, produced by Hitachi Chemical Co., Ltd.) 206 laminated thereon as the lid plate 205, the lid plate 205 was pressure adhered under heating onto the ink pathway wall forming member 203 and the filling member 204. The pressure adhesion conditions were a temperature of 100° C. and a pressure of 4.0 $Kg/cm^2$.

Next, by use of PLA 501 (produced by Canon), the whole surface exposure of the laminated product having the lid plate 205 laminated thereon shown in FIG. 3D was effected, and then this was dipped in AZ 312MIF developer (trade name, manufactured by Hoechst) which is a liquid for dissolving the filling member 204 to remove the filling member 204, while promoting dissolution by stirring with $N_2$ gas, to form ink pathways.

Figure 3E:
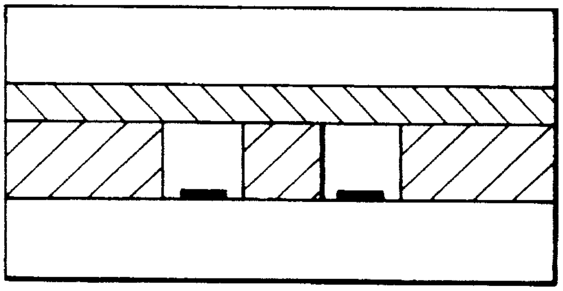

Finally, the laminated member after completion of the above removal step was applied with UV-ray irradiation and subsequently with baking treatment (temperature 150° C.) to effect complete curing of the ink pathway wall forming member 203 and the dry film 206 of the lid plate 205, whereby the ink jet recording head as shown in FIG. 3E was completed.

When the recording head thus obtained was observed, no "sagging" was found to be generated and the discharging direction of ink was also good with stability.

EXAMPLE 2

Figure 4:
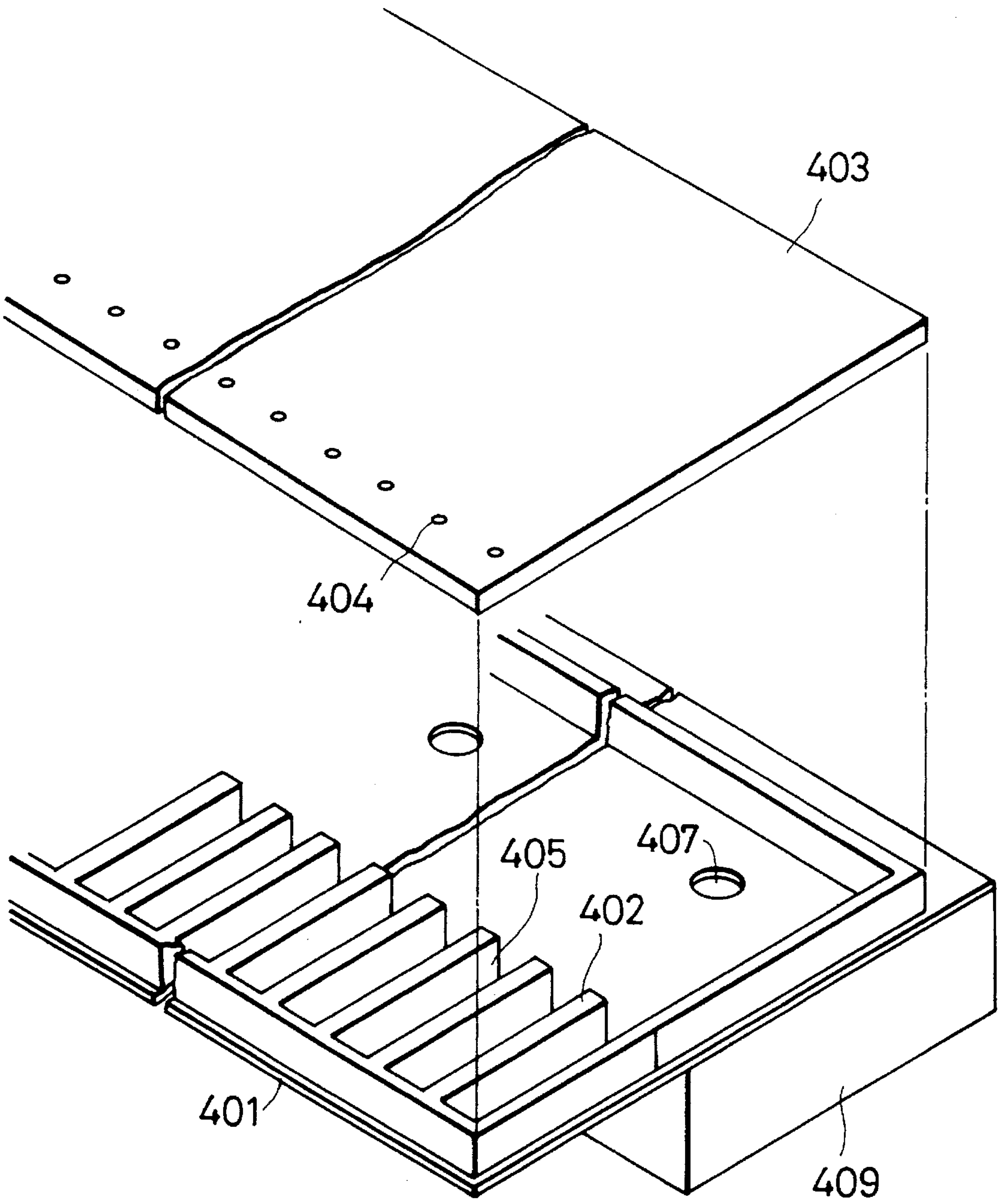
FIG. 4 is a schematic exploded perspective view of another example of the ink jet recording head formed by the present invention.

An ink jet recording head shown in FIG. 4 was prepared by following the procedure of Example 1 with the exception that the ink pathway wall forming member 402 was formed in a pattern other than the pattern in Example 1. In the ink jet recording head shown in FIG. 4, the substrate 401 on which discharging energy generating sections (not shown) are provided has an ink feeding inlet 407 formed therethrough. Discharging orifices 404 are formed through a lid plate 403 and arranged above the discharging energy generating sections (not shown). In FIG. 4, the symbol 405 shows the ink pathway, 409 an ink chamber communicating to the ink feeding Inlet 407.

When the ink jet recording head thus obtained was observed, no "sagging" was found to be generated. Furthermore, the distance between the discharging orifice and the discharging energy generating section was uniform and ink discharging characteristics were good with stability.

In the above examples, the case of forming an ink pathway wall by use of a photosensitive resin composition was taken as the example with the most remarkable effect of the present invention. However, the ink pathway of the present invention is not limited to those which are formed by use of such a material, but the present invention can act effectively, provided that a material having temporarily no rigidity is used in at least a part of the ink pathway forming member. Also, in the above Examples, the case of using a photosensitive resin composition as the filling member as the example with the most remarkable effect of the present invention. However, the filling member in the present invention is not limited to such material, but various materials which can prevent generation of "sagging" can be used.

Furthermore, in the above examples, the case in which a member for forming the wall of the recessed portion was formed on the substrate as a separate member has been explained. However, in the present invention, the substrate and the member for forming the wall of the recessed portion can be formed integrally. In this case, the recessed portion may be formed by, for example, etching a flat plate.

Also, in the above examples, as a preferred embodiment of the present invention, there has been described the case in which after providing the filling member so as to cover the upper surface of the ink pathway wall forming member, the filling member was partially removed until the upper surface of the ink pathway forming member is exposed. However, the present invention is not limited to this embodiment. The present invention includes, for example, the embodiment in which the filling member is provided in the recessed portion of the substrate to a level lower than the height of the ink pathway wall forming member and the upper surface portion of the ink pathway wall forming member and/or the filling member are eliminated by etching, or another method to effect flattening of the whole of the surface to be bonded with the lid plate.

The present invention has the effects as enumerated below:

1) Even in a recording head with small discharging orifice, for example, about 30 μm square, ink pathways can be formed with good precision, whereby variance of discharging performance became smaller to improve yield.

2) During manufacturing of a recording head having a plurality of ink pathways, particularly a large scale recording head with A4 width, variance per every ink pathway became smaller to improve discharging performance.

3) Restrictions with respect to ink pathway width and size of ink pathway wall became smaller, whereby the degree of freedom in recording head design became increased.

4) Since the flattening treatment is effected, a gap is not generated between the substrate and the flat plate. Accordingly, "sagging phenomenon" can be fully prevented.

What is claimed is:

1. A method for producing an ink jet recording head, comprising the steps of:

preparing a first substrate provided with a discharge energy generating element for generating a discharge energy to be utilized for discharging an ink;

providing a negative photosensitive resin for forming an ink pathway wall on a surface of the first substrate on which the discharge energy generating element is provided;

patterning the negative photosensitive resin to form an ink pathway groove;

applying to the patterned negative photosensitive resin onto the whole surface of the first substrate a liquid positive photosensitive resin in an amount sufficient to fill the ink pathway groove;

dry etching the liquid positive photosensitive resin until the patterned negative photosensitive resin is exposed to thereby flatten the surface of the negative photosensitive resin;

bonding a second substrate to the flattened surface of the negative photosensitive resin under pressure;

light exposing simultaneously the negative photosensitive resin and the liquid positive photosensitive resin; and removing the light exposed liquid positive photosensitive resin to form the ink pathway.

2. A method for producing an ink jet recording head according to claim 1, wherein said bonding step comprises the step of bonding at least the surface of said first substrate subjected to the step of dry etching to said second substrate which comprises a laminated member and a layer of a photosensitive resin composition provided thereon.

3. A method for producing an ink jet recording head according to claim 1, wherein said bonding step comprises the step of bonding at least the surface of said first substrate subjected to the step of dry etching to said second substrate in which a negative-type dry film is used as the negative type photoresist.

4. A method for producing an ink jet recording head according to claim 2, wherein said bonding step comprises the step of bonding at least the surface of said first substrate subjected to the step of dry etching to said second substrate which comprises a glass plate.

5. A method for producing an ink jet recording head according to claim 1, wherein said bonding step includes bonding said first substrate and said second substrate by pressure contact under heat.

6. A method for producing an ink jet recording head according to claim 1, wherein said removing step comprises the step of removing the light exposed liquid positive photosensitive resin by use of a dissolving liquid for dissolving said light exposed liquid positive photosensitive resin.

7. A method for producing an ink jet recording head according to claim 1, further comprising the step of subjecting the ink jet recording head to exposure treatment after the step of removing said light exposed liquid positive photosensitive resin to form said ink pathway.

8. A method for producing an ink jet recording head according to claim 7, wherein said exposure treatment after the step of removing said resin filling material to form said ink pathway comprises the step of effecting exposure by the use of an ultraviolet light.

9. A method for producing an ink jet recording head according to claim 1, further comprising the step of subjecting the ink jet recording head to a baking treatment after the step of removing said resin filling material to form said ink pathway.

* * * * *

UNITED STATES PATENT AND TRADEMARK OFFICE
CERTIFICATE OF CORRECTION

PATENT NO. : 5,582,678

DATED : December 10, 1996

INVENTOR(S) : Hirokazu Komuro

It is certified that error appears in the above-indentified patent and that said Letters Patent is hereby corrected as shown below:

ON THE COVER PAGE

Under "Attorney, Agent or Firm",

"Fitzpatrick, Chella, Harper & Scinto" should read --Fitzpatrick, Cella, Harper & Scinto--.

[57] In the Abstract,

Line 5, "of" should read --of the--.

COLUMN 1

Line 63, "occured." should read --occurs--.

COLUMN 3

Line 35, "having" should read --has--.

COLUMN 4

Line 2, "compositions" should read --composition--.

UNITED STATES PATENT AND TRADEMARK OFFICE
CERTIFICATE OF CORRECTION

PATENT NO. : 5,582,678

DATED : December 10, 1996

INVENTOR(S) : Hirokazu Komuro

It is certified that error appears in the above-indentified patent and that said Letters Patent is hereby corrected as shown below:

COLUMN 5
Line 67, "Inlet 407." should read --inlet 407.--.

Signed and Sealed this

First Day of July, 1997

Attest:

BRUCE LEHMAN

Attesting Officer

Commissioner of Patents and Trademarks